US009009596B2

(12) United States Patent
Ortiz

(10) Patent No.: US 9,009,596 B2
(45) Date of Patent: Apr. 14, 2015

(54) METHODS AND SYSTEMS FOR PRESENTING MEDIA CONTENT GENERATED BY ATTENDEES OF A LIVE EVENT

(75) Inventor: Guillermo Ortiz, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 13/300,918

(22) Filed: Nov. 21, 2011

(65) Prior Publication Data
US 2013/0132836 A1 May 23, 2013

(51) Int. Cl.
| G06F 3/00 | (2006.01) |
| G06F 13/00 | (2006.01) |
| H04N 5/445 | (2011.01) |
| G06F 3/01 | (2006.01) |
| G06F 17/30 | (2006.01) |
| H04N 1/00 | (2006.01) |
| H04N 21/218 | (2011.01) |
| H04N 21/2187 | (2011.01) |
| H04N 21/262 | (2011.01) |
| H04N 21/2665 | (2011.01) |
| H04N 21/2668 | (2011.01) |
| H04N 21/2743 | (2011.01) |
| H04N 21/414 | (2011.01) |
| H04N 21/4223 | (2011.01) |
| H04N 21/45 | (2011.01) |
| H04N 21/8547 | (2011.01) |
| H04W 4/04 | (2009.01) |
| H04W 4/18 | (2009.01) |
| H04L 29/06 | (2006.01) |

(52) U.S. Cl.
CPC ............ *G06F 3/01* (2013.01); *G06F 17/30041* (2013.01); *G06F 17/30044* (2013.01); *G06F 17/30064* (2013.01); *G06F 17/30056* (2013.01); *H04N 1/00* (2013.01); *H04N 21/21805* (2013.01); *H04N 21/2187* (2013.01); *H04N 21/26258* (2013.01); *H04N 21/2665* (2013.01); *H04N 21/2668* (2013.01); *H04N 21/2743* (2013.01); *H04N 21/41407* (2013.01); *H04N 21/4223* (2013.01); *H04N 21/4524* (2013.01); *H04N 21/8547* (2013.01); *H04W 4/04* (2013.01); *H04W 4/185* (2013.01); *H04L 65/4084* (2013.01)

(58) Field of Classification Search
USPC ...................................... 715/717, 716; 725/48
See application file for complete search history.

(56) References Cited

U.S. PATENT DOCUMENTS

| 8,141,115 | B2* | 3/2012 | Wohlert et al. | ................. 725/48 |
| 2003/0177503 | A1* | 9/2003 | Sull et al. | ....................... 725/112 |
| 2003/0189589 | A1* | 10/2003 | LeBlanc et al. | ............... 345/723 |

(Continued)

Primary Examiner — Steven Sax
Assistant Examiner — Wilson Varga

(57) ABSTRACT

An exemplary method includes a media content presentation system receiving a plurality of timestamped and geotagged media content instances generated during a live event by a plurality of attendees of the live event, detecting input provided by a user specifying a time period associated with the live event and input provided by the user specifying a viewing area within a venue associated with the live event, identifying one or more media content instances that have a timestamp included within the specified time period and a geotagged location within the specified viewing area, and presenting the identified one or more media content instances to the user within a graphical user interface in a manner that is temporally synchronized with an event timeline associated with the live event. Corresponding methods and systems are also disclosed.

21 Claims, 11 Drawing Sheets

(56) References Cited

U.S. PATENT DOCUMENTS

| | | | |
|---|---|---|---|
| 2004/0217884 A1* | 11/2004 | Samadani et al. | 340/995.14 |
| 2009/0089294 A1* | 4/2009 | Davis et al. | 707/10 |
| 2009/0148124 A1* | 6/2009 | Athsani et al. | 386/46 |
| 2009/0300498 A1* | 12/2009 | Falchuk | 715/719 |
| 2010/0115411 A1* | 5/2010 | Sorokin et al. | 715/723 |
| 2010/0183280 A1* | 7/2010 | Beauregard et al. | 386/54 |
| 2010/0299703 A1* | 11/2010 | Altman | 725/48 |
| 2011/0029894 A1* | 2/2011 | Eckstein | 715/753 |
| 2011/0055283 A1* | 3/2011 | Wallace et al. | 707/802 |
| 2011/0225498 A1* | 9/2011 | Goldman et al. | 715/727 |
| 2011/0239136 A1* | 9/2011 | Goldman et al. | 715/757 |
| 2011/0307925 A1* | 12/2011 | Vaysman et al. | 725/48 |
| 2012/0041956 A1* | 2/2012 | Smith-Semedo et al. | 707/741 |
| 2012/0079380 A1* | 3/2012 | Tsai et al. | 715/716 |
| 2012/0198335 A1* | 8/2012 | Huang | 715/716 |

* cited by examiner

METHODS AND SYSTEMS FOR PRESENTING MEDIA CONTENT GENERATED BY ATTENDEES OF A LIVE EVENT

BACKGROUND INFORMATION

Users of mobile devices (e.g., mobile phones) often take photos, capture video, and/or otherwise generate media content with their mobile devices while in attendance at a live event (e.g., a sporting event, a concert, etc.). These users may then use various media content sharing services (e.g., Facebook, Twitter, etc.) to share the generated media content with other users (e.g., friends and/or other users not in attendance at the live event). For example, an attendee of a live event may upload a photo taken at the live event to a website associated with a media content sharing service, after which friends of the user may view the photo by logging on to the website.

Such media content sharing services are limited, however, in the way they present media content generated and shared by attendees of a live event. For example, a user accessing a shared photo taken by an attendee of a live event may not be able to readily ascertain at what point during the live event the photo was taken by the attendee and/or where the attendee was located when the photo was taken. Moreover, traditional media content sharing services do not provide ways for a user to dynamically experience multiple media content instances generated by attendees of a live event in a manner that is synchronized with the live event.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
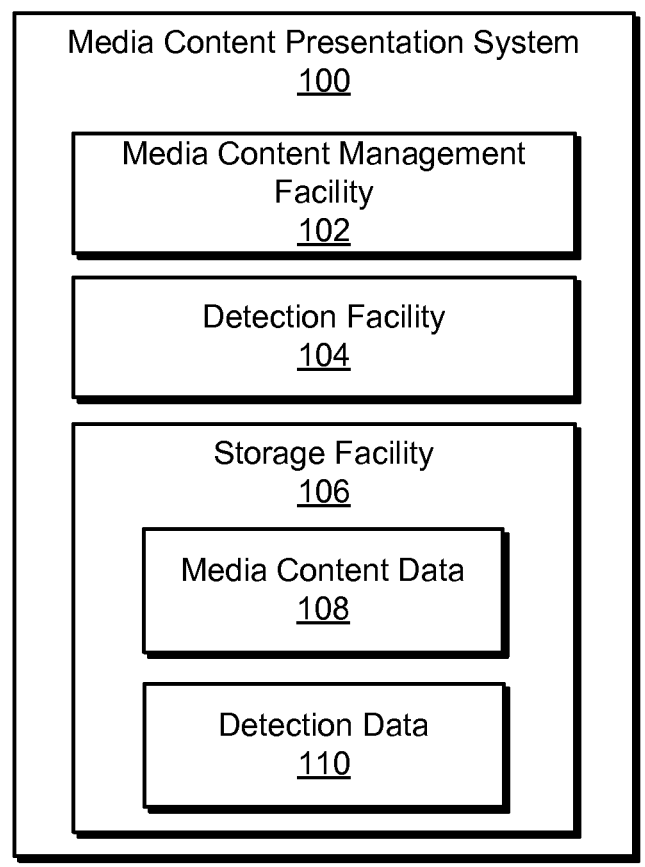
FIG. 1 illustrates an exemplary media content presentation system according to principles described herein.

Methods and systems for presenting media content generated by attendees of a live event are described herein. As will be described below, a media content presentation system may receive a plurality of timestamped and geotagged media content instances generated during a live event by a plurality of attendees of the live event, detect input provided by a user specifying a time period associated with the live event and input provided by the user specifying a viewing area within a venue associated with the live event, identify one or more of the media content instances that have a timestamp included within the specified time period and a geotagged location included within the specified viewing area, and present the identified one or more media content instances to the user within a graphical user interface in a manner that is temporally synchronized with an event timeline associated with the live event.

As used herein, a "live event" refers to a sporting event, a concert, a show, a meeting, a gathering, and/or any other event that may take place at a venue (e.g., a stadium, an arena, a concert hall, a theater, a conference room, etc.) and that may be attended by one or more people ("attendees"). A live event may include a main event (e.g., a football game) and one or more related events and/or time periods (e.g., a pre-game event or time period, a halftime event or time period, and/or a post-game event or time period).

As used herein, the terms "media content" and "media content instance" may refer to any photo, video, audio clip, social media post (e.g., a "Tweet" or a Facebook update), or any segment, component, or combination of these or other forms of media content that may be created, captured, or otherwise generated by an attendee of a live event.

As used herein, an "event timeline" associated with a live event specifies a temporal order in which various portions of the live event occur. An event timeline associated with a live event may also specify a temporal order in which various portions of the live event occur during a presentation of the live event. Exemplary presentations of a live event include, but are not limited to, a television broadcast, multicast, or narrowcast of the live event, a streaming of the live event, a playback of a recorded version of the live event, a presentation of a simulated version (e.g., an Internet-based "gamecast" or the like) of the live event, a presentation of an audio portion of the live event, and/or any other type of presentation of the live event. Hence, presenting a media content instance in a manner that is "temporally synchronized" with an event timeline associated with a live event refers to presenting the media content instance for a predetermined amount of time associated with (e.g., including and/or following) a temporal position along the event timeline that corresponds to the timestamp of the media content instance. As an example, a photo taken of a tackle made during a football game may be presented during a time period that includes and/or follows an occurrence of the tackle within a presentation of the football game.

The methods and systems described herein may enhance an interaction experience of a user with a live event by allowing the user to experience the live event from the perspective of various attendees scattered throughout the venue at which the live event takes place. For example, the user may choose to experience media content instances captured by attendees located in a particular seating area within the venue and/or media content instances captured by attendees during a particular time period associated with the live event.

To illustrate, a user may be watching a television broadcast of a football game and desire to access media content generated by attendees of the football game while he or she watches the television broadcast. To this end, the user may use a mobile phone, tablet computer, or the like to access a companion television application associated with the television broadcast of the football game. The companion television application may allow the user to specify a particular viewing area (e.g., a particular seating area within the football stadium) in which the user is interested. Media content generated by attendees located in the specified viewing area may then be presented to the user by way of the companion television application in a manner that is temporally synchronized with the television broadcast of the football game. In this manner, the user may watch the football game on his or her television and at the same time view or otherwise access temporally synchronized photos, videos, and/or other media content instances generated by users seated in the specified viewing area.

FIG. 1 illustrates an exemplary media content presentation system 100 ("system 100"). As shown, system 100 may include, without limitation, a media content management facility 102, a detection facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Media content management facility 102 may be configured to manage (e.g., receive, maintain, distribute, present, and/or otherwise process) media content generated by attendees of a live event. For example, media content management facility 102 may receive a plurality of time stamped and geotagged media content instances generated during a live event by a plurality of attendees of the live event. This may be performed in any suitable manner. For example, media content management facility 102 may receive one or more uploads of the plurality of time stamped and geotagged media content instances from a plurality of mobile devices used by the plurality of attendees.

Media content management facility 102 may be configured to distinguish media content generated at a live event from media content generated elsewhere in any suitable manner. For example, media content management facility 102 may analyze the geotagged location of a particular media content instance to determine whether the geotagged location is within a geographic vicinity associated with the live event (e.g., within a venue of the live event). Additional functions that may be performed by media content management facility 102 will be described below.

Detection facility 104 may be configured to detect input provided by a user specifying a time period associated with a live event and input provided by the user specifying a viewing area within a venue associated with the live event. The input may be provided by any type of user as may serve a particular implementation. For example, the input may be provided by a user viewing or otherwise experiencing a presentation of the live event (e.g., television broadcast or streaming of the live event), a user in attendance at the live event, and/or any other type of user as may serve a particular implementation.

Input specifying a time period associated with a live event may be provided by a user in any suitable manner. For example, detection facility 104 may provide one or more graphical user interfaces ("GUIs") configured to facilitate user input specifying a time period associated with a live event. To illustrate, the live event may include a concert. In this case, detection facility 104 may provide a GUI configured to allow a user to select a particular song performed during the concert. Detection facility 104 may detect the user selection of the song and accordingly designate a time period associated with the song as being the specified time period. As another example, the live event may include a sporting event. In this case, detection facility may provide a GUI configured to allow a user to select an official time period associated with the sporting event (e.g., a quarter, half, period, inning, set, game, etc.). Examples of a user specifying a time period associated with the live event will be described in more detail below.

Input specifying a viewing area associated with a live event may also be provided by a user in any suitable manner. For example, a user may utilize one or more GUIs provided by detection facility 104 to specify a particular seating area within a venue associated with a live event, a particular viewing angle of a playing surface (e.g., a stage, field, court, etc.) associated with the live event, and/or any other type of viewing area associated with the live event as may serve a particular implementation. Examples of this will also be described in more detail below.

In response to user input specifying a time period and a viewing area associated with a live event, media content management facility 102 may identify one or more attendee-generated media content instances that have a timestamp included within the specified time period and a geotagged location included within the specified viewing area. This may be performed in any suitable manner. For example, media content management facility 102 may determine that the timestamp(s) of the one or more media content instances correspond to temporal positions within the specified time period along an event timeline associated with the live event and that the geotagged location(s) of the one or more media content instances are within a geographic vicinity defined by the specified viewing area.

Media content management facility 102 may be further configured to present the identified one or more media content instances to the user within a GUI in a manner that is temporally synchronized with an event timeline associated with the live event. As mentioned above, this may be performed by presenting each media content instance for a predetermined amount of time associated with (e.g., including and/or following) a temporal position (i.e., a temporal position along the event timeline) that corresponds to the timestamp of the media content instance. Examples of presenting media content instances in a manner that is temporally synchronized with an event timeline associated with a live event will be illustrated below.

Media content management facility 102 may be further configured to dynamically transition from presenting media content generated by attendees located in a particular viewing area to presenting media content generated by attendees located in a different viewing area. In some examples, this transition may be performed in response to user selection of the different viewing area. Alternatively, media content management facility 102 may perform the transition automatically. For example, media content management facility 102 may rotate through presenting media content generated in different viewing areas so as to allow the user to experience the live event from a number of different viewing angles.

Likewise, media content management facility 102 may be further configured to dynamically transition from presenting media content generated by attendees during a particular time period associated with the live event to presenting media content generated by attendees during a different time period associated with the live event. In some examples, this transition may be performed in response to user selection of the different time period. Alternatively, media content management facility 102 may perform the transition automatically. For example, a user may have initially selected a particular time period for presentation of attendee-generated media content. Upon completion of the time period, media content management facility 102 may automatically transition to presenting media content generated during a time period that immediately follows the initially selected time period.

In some examples, media content management facility 102 may automatically determine a presentation order that is to be used to present attendee-generated media content instances to a user. For example, the presentation order may follow a viewing path representative of a plurality of different viewing angles of the live event within a venue associated with the live event. Media content management facility 102 may then present the media content instances to the user in accordance with the presentation order and in a manner that is temporally synchronized with an event timeline associated with the live event. An example of this will be provided in more detail below.

Media content management facility 102 may be further configured to facilitate creation by a user of one or more filter rules configured to govern an operation of media content management facility 102. For example, a user may specify that he or she wants to view media content generated only by particular attendees of the live event (e.g., attendees who are social media contacts or friends of the user). Additionally or alternatively, a user may specify that he or she wants to view only certain types of media content instances (e.g., photos) and/or create any other filter rule as may serve a particular implementation.

Storage facility 106 may be configured to maintain media content data 108 representative of media content generated by attendees of a live event and detection data 110 generated and/or used by detection facility 104. It will be recognized that storage facility 106 may maintain additional or alternative data as may serve a particular implementation.

Figure 2:
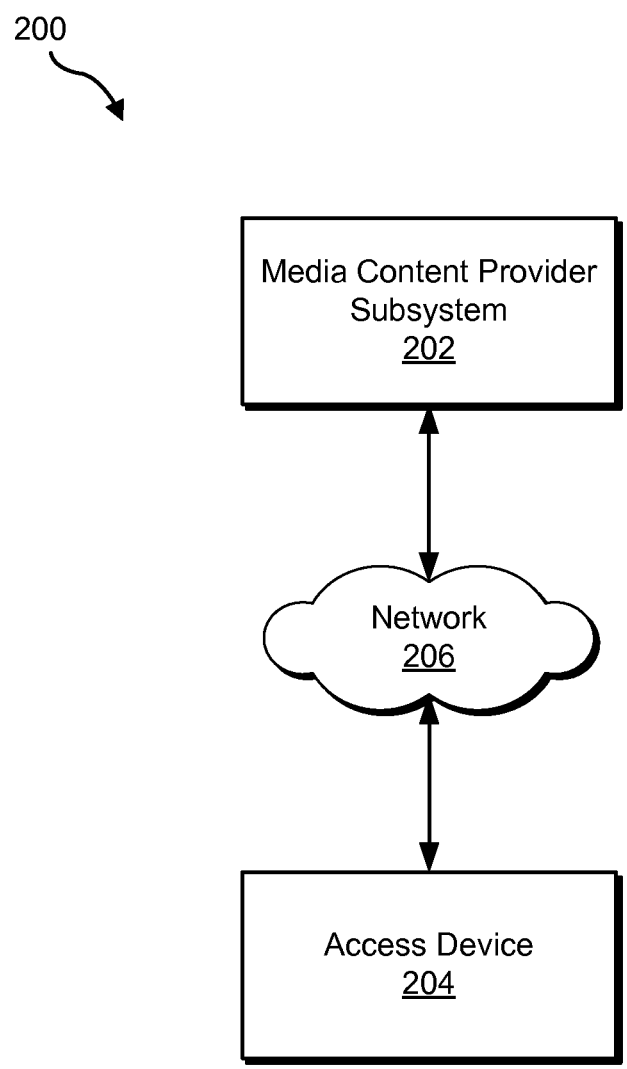
FIG. 2 illustrates an exemplary implementation of the system of FIG. 1 according to principles described herein.

FIG. 2 illustrates an exemplary implementation 200 of system 100 wherein a media content provider subsystem 202 is communicatively coupled to a media content access device 204 ("access device 204") by way of a network 206. As will be described in more detail below, media content management facility 102, detection facility 104, and storage facility 106 may each be implemented by media content provider subsystem 202 and/or access device 204.

Media content provider subsystem 202 may be associated with a service provider (e.g., a subscriber television service provider, an Internet service provider, a shared media content service provider, etc.), a media content provider (e.g., ESPN, NBC, etc.), and/or any other type of media content provider. Accordingly, media content provider subsystem 202 may be configured to provide one or more media content services (e.g., television services, video-on-demand services, Internet services, media content sharing services, companion television application services, etc.) to access device 204. For example, media content provider subsystem 202 may be configured to manage (e.g., maintain, process, distribute, and/or generate) media content configured to be delivered to access device 204. As another example, media content provider subsystem 202 may be configured to manage media content generated by attendees of a live event. Media content provider subsystem 202 may be implemented by one or more computing devices (e.g., one or more servers) as may serve a particular implementation.

Additionally or alternatively, media content provider subsystem 202 may be implemented by one or more third party servers configured to manage media content generated by attendees of a live event, interface with one or more social media service provider subsystems, and/or perform any other operation associated with the methods and systems described herein.

Access device 204 may facilitate access by a user to content (e.g., media content instances) provided by media content provider subsystem 202. For example, access device 204 may be configured to perform one or more access events at the direction of a user. To illustrate, access device 204 may present and/or record a media content instance at the direction of a user. Access device 204 may additionally or alternatively be configured to provide access to media content generated by attendees of a live event.

Access device 204 may be implemented by any suitable combination of media content processing or computing devices ("processing devices"). For example, access device 204 may be implemented by one or more set-top box devices, digital video recording ("DVR") devices, personal computers, mobile devices (e.g., mobile phones and/or tablet computers), personal-digital assistant devices, gaming devices, television devices, etc.

Media content provider subsystem 202 and access device 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 202 and access device 204 may communicate using any suitable network. For example, as shown in FIG. 2, media content provider subsystem 202 and access device 204 may be configured to communicate with each other by way of network 206. Network 206 may include one or more networks or types of networks capable of carrying communications and/or data signals between media content provider subsystem 202 and access device 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Figure 3:
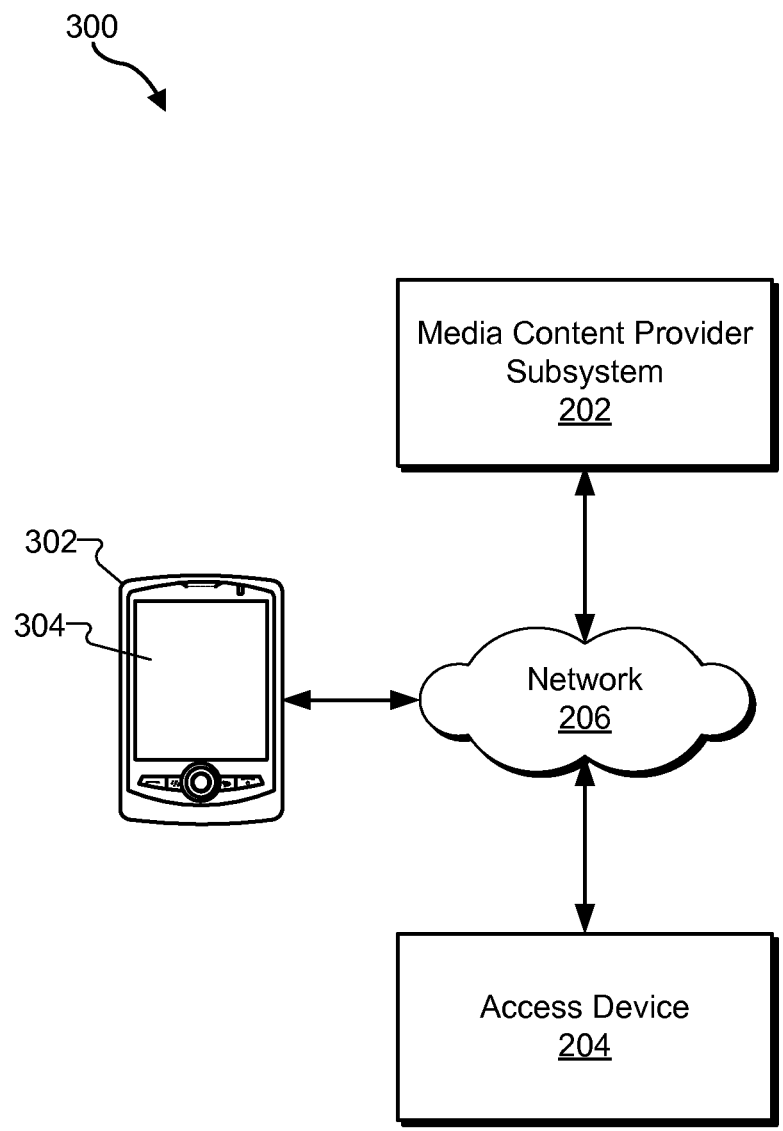
FIG. 3 illustrates another exemplary implementation of the system of FIG. 1 according to principles described herein.

FIG. 3 illustrates another exemplary implementation 300 of system 100. Implementation 300 is similar to implementation 200 in that it includes media content provider subsystem 202 and access device 204 configured to communicate by way of network 206. However, implementation 300 further includes a companion device 302 configured to facilitate user access to a media content service associated with media content available by way of access device 204. For example, companion device 302 may be configured to facilitate access to a companion television application service associated with a television service provided by way of access device 204. As shown, companion device 302 may communicate with access device 204 by way of network 206 (e.g., by way of a home Wi-Fi network or the like), and may utilize any suitable communication technologies, devices, media, and protocols supportive of data communications.

In certain embodiments, system 100 may be implemented entirely by media content provider subsystem 202, by access device 204, or by companion device 302. In other embodiments, components of system 100 may be distributed across any combination of media content provider subsystem 202, access device 204, and companion device 302.

Figure 4:
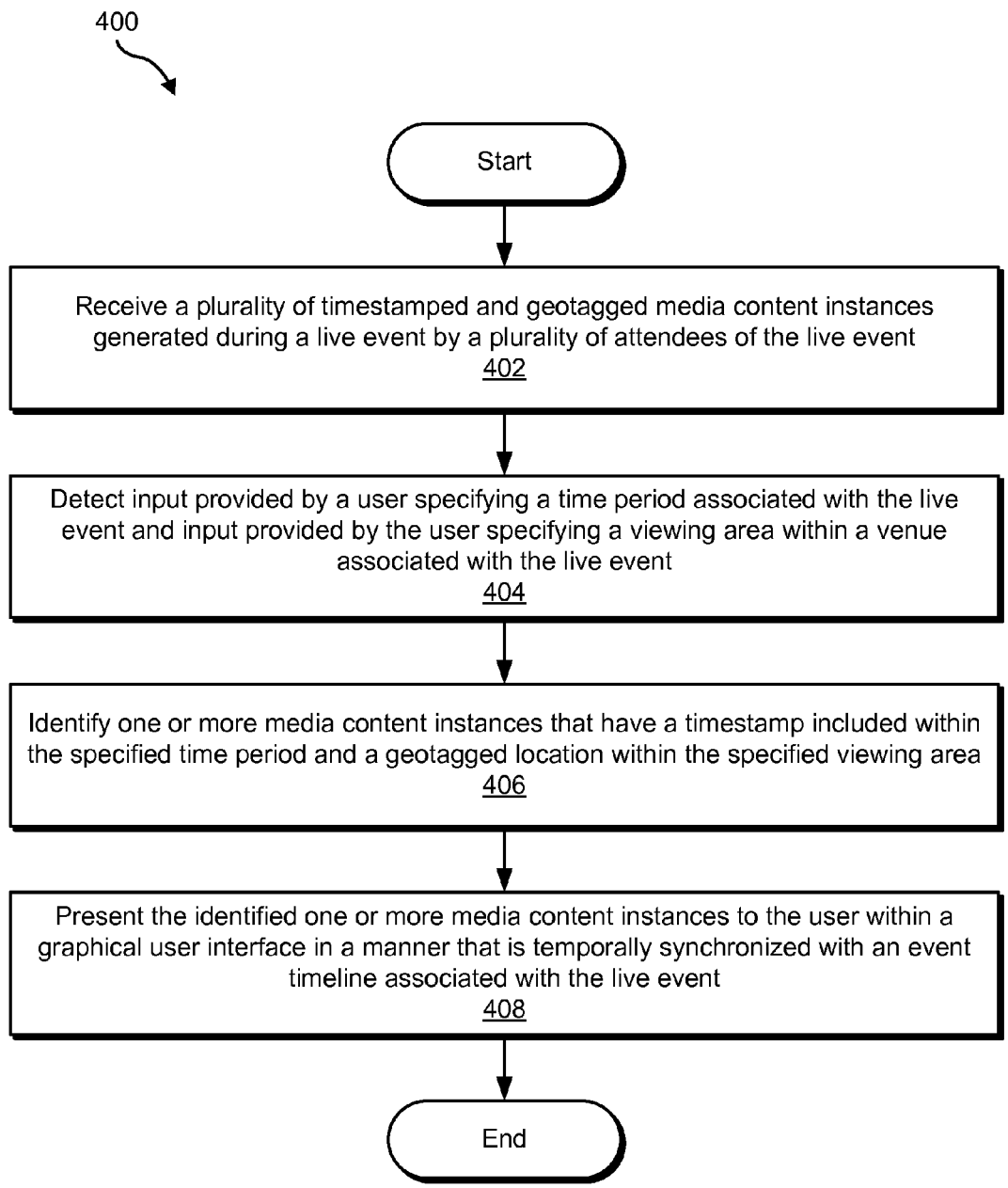
FIG. 4 illustrates an exemplary method of presenting media content generated by attendees of a live event according to principles described herein.

FIG. 4 illustrates an exemplary method 400 of presenting media content generated by attendees of a live event. While FIG. 4 illustrates exemplary steps according to one embodiment, other embodiments may omit, add to, reorder, and/or modify any of the steps shown in FIG. 4. One or more of the steps shown in FIG. 4 may be performed by system 100 and/or any implementation thereof.

In step 402, a media content presentation system receives a plurality of timestamped and geotagged media content instances generated during a live event by a plurality of attendees of the live event. Step 402 may be performed in any of the ways described herein.

In step 404, the media content presentation system detects input provided by a user specifying a time period associated with the live event and input provided by the user specifying a viewing area within a venue associated with the live event. Step 404 may be performed in any of the ways described herein.

In step 406, the media content presentation system identifies one or more of the received media content instances that have a timestamp included within the specified time period and a geotagged location within the specified viewing area. Step 406 may be performed in any of the ways described herein.

In step 408, the media content presentation system presents the identified one or more media content instances to the user within a graphical user interface in a manner that is temporally synchronized with an event timeline associated with the live event. Step 408 may be performed in any of the ways described herein.

Various implementations of system 100 and method 400 will now be described. It will be recognized that the implementations described herein are merely illustrative of the many different implementations that may be realized in connection with the methods and systems described herein.

Figure 5:
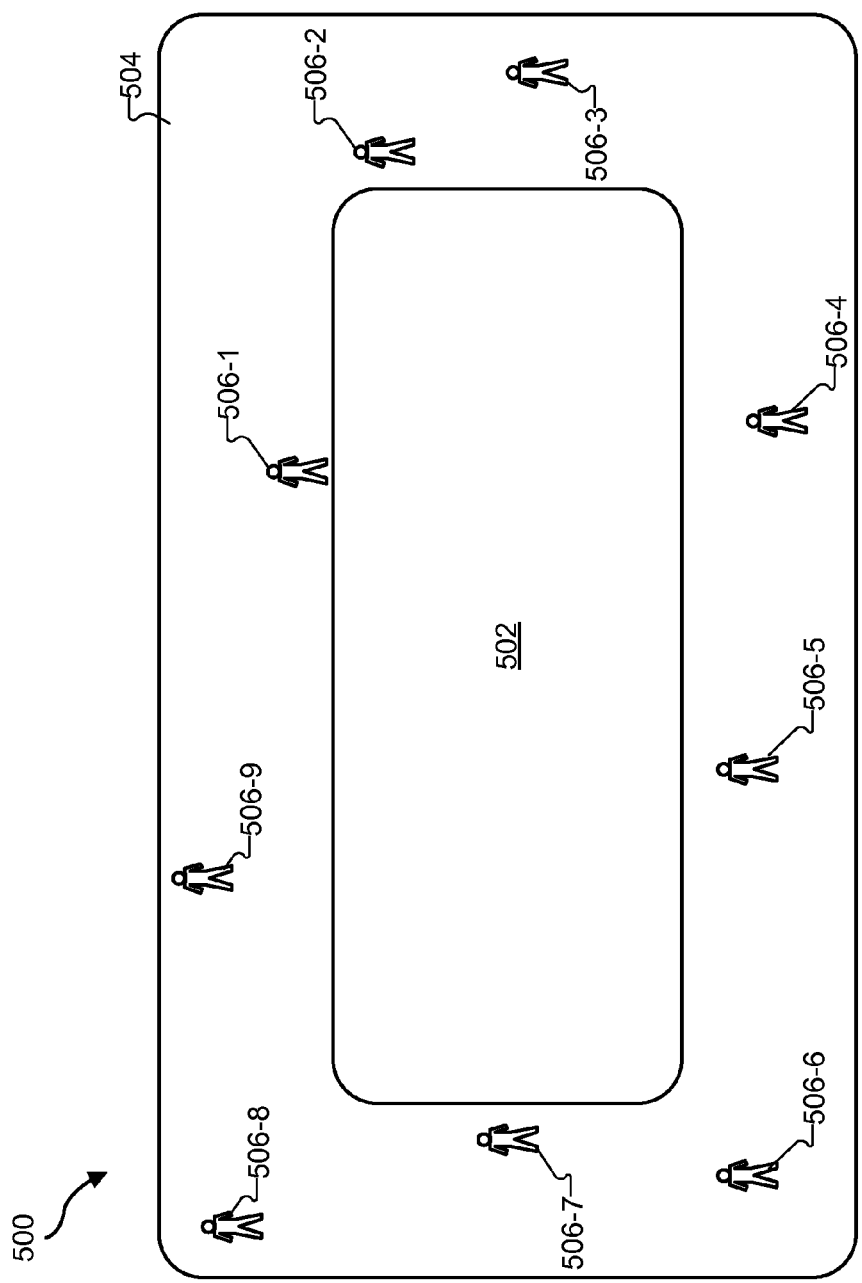
FIG. 5 shows a top view of a venue at which a live event may take place according to principles described herein.

FIG. 5 shows a top view of a venue 500 at which a live event may take place. As shown, venue 500 may include a playing surface 502 and a seating area 504. One or more attendees 506 (e.g., attendees 506-1 through 506-9) may be in attendance at the live event. As shown, attendees 506 may be scattered throughout seating area 504 and may therefore each witness the live event from a different viewing angle. While FIG. 5 shows all of the attendees 506 being located within seating area 504, it will be recognized that one or more attendees 506 may be located on playing surface 502.

As mentioned, one or more attendees 506 may generate a plurality of media content instances during a live event that takes place at venue 500. For example, one or more attendees 506 may use a mobile device to take a photo, capture video, and/or create a social media post while in attendance at the live event. Each media content instance generated by attendees 506 may be timestamped and geotagged (e.g., by the mobile devices used to generate each media content instance) and then uploaded to system 100 in any suitable manner.

Figure 6:
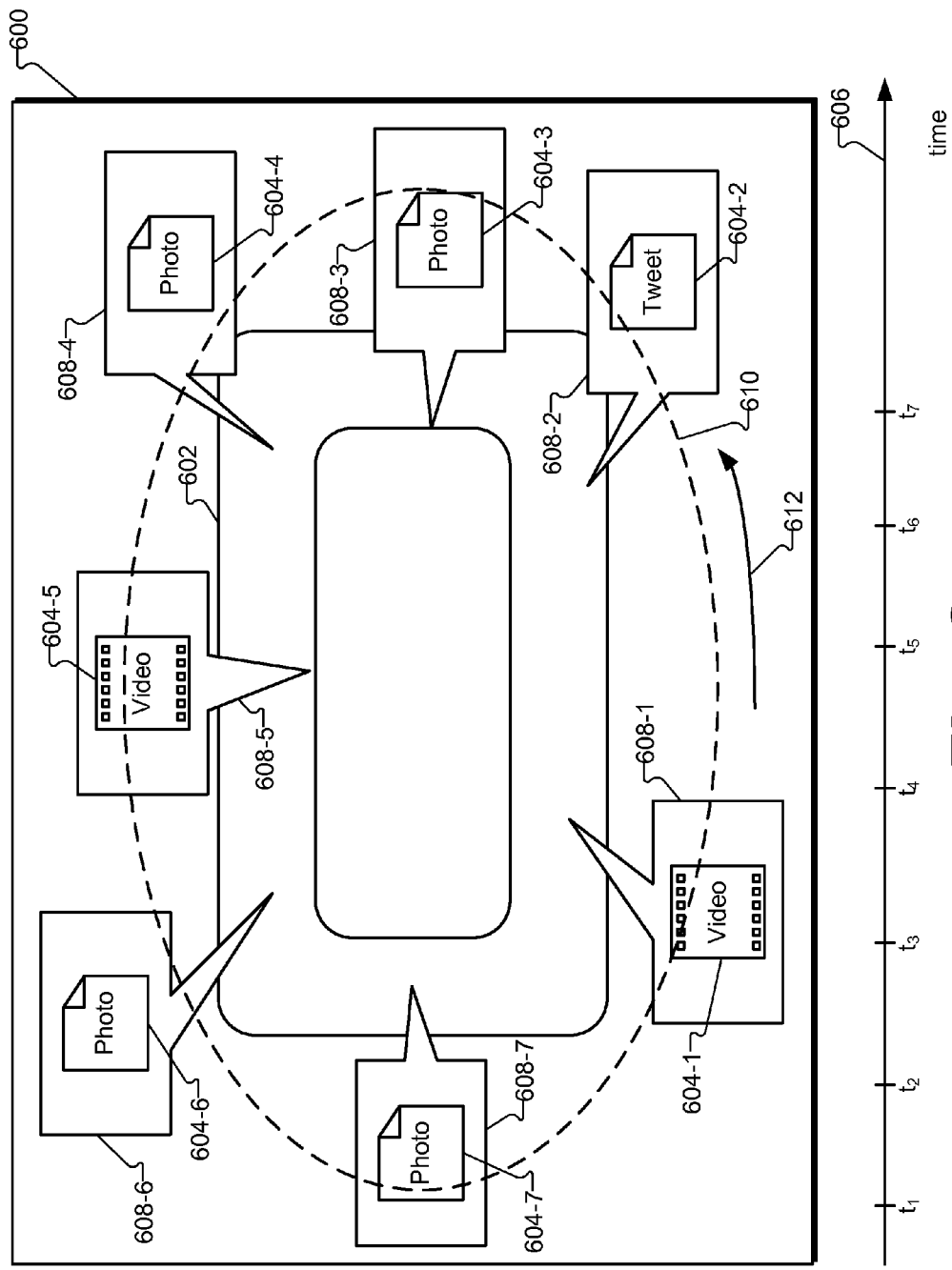
FIGS. 6-9 show various graphical user interfaces ("GUIs") that may be used to present media content instances generated by attendees of a live event to a user according to principles described herein.

FIG. 6 shows an exemplary GUI 600 that may be used to present various media content instances generated by attendees 506 to a user in a manner that is temporally synchronized with an event timeline associated with the live event. As shown, GUI 600 may include a graphical object 602 that depicts or graphically represents venue 500.

As will be described below, various media content instances 604 (e.g., media content instances 604-1 through 604-7) generated by attendees 506 may be presented within GUI 600. Each media content instance 604 may have a timestamp that corresponds to a particular temporal position along an event timeline 606 associated with the live event. In the example of FIG. 6, media content instances 604-1 through 604-7 have timestamps corresponding to temporal positions $t_1$ through $t_7$, respectively. Each media content instance 604 may also have a geotagged location corresponding to a particular location within venue 500. The geotagged locations of each media content instance 604 may be graphically indicated within GUI 600 by callouts 608 (e.g., callouts 608-1 through 608-7). It will be recognized that system 100 may graphically indicate a geotagged location of each media content instance 604 with respect to the graphical object 602 that depicts venue 500 in any other manner as may serve a particular implementation.

In the example of FIG. 6, a user has selected an option to view media content instances generated anywhere within venue 500 (e.g., by designating the viewing area as the entire venue 500) and to view media content instances generated at any point in time during event timeline 606. In some examples, these options may be automatically selected by system 100 in the absence of user input specifying a particular time period and/or viewing area. As will be described below, a user may alternatively select a particular time period and/or viewing area within venue 500.

System 100 may present media content instances 604 within GUI in accordance with any suitable presentation order based on the timestamps and geotagged locations of media content instances 604. For example, the presentation order may circle around the graphical object 602 that depicts venue 500 in a manner that is temporally synchronized with event timeline 606, as illustrated by viewing path 610 and arrow 612. It will be recognized that the viewing path 610 is merely illustrative and that alternative viewing paths may be specified to create different viewing experiences for the user.

To illustrate, GUI 600 may initially not include any of media content instances 604 presented therein. At a time corresponding to temporal position $t_1$, media content instance 604-1 and its corresponding callout 608-1 may be presented within GUI 600. At a time corresponding to temporal position $t_2$, media content instance 604-2 and its corresponding callout 608-2 may be presented within GUI 600. Viewing path 610 may be followed until media content instance 604-7 and its corresponding callout 608-7 are presented at a time corresponding to temporal position $t_7$. It will be recognized that each of media content instances 604 may be presented within GUI 600 for any suitable amount of time. For example, a particular media content instance and its corresponding callout (e.g., media content instance 608-1 and callout 608-1) may be removed from being presented within GUI 600 after a predetermined amount of time (e.g., ten seconds) and/or to make room in GUI 600 for presentation of another media content instance and/or callout. It will be recognized that presentation time periods of various media content instances may overlap as my serve a particular implementation.

Figure 7:
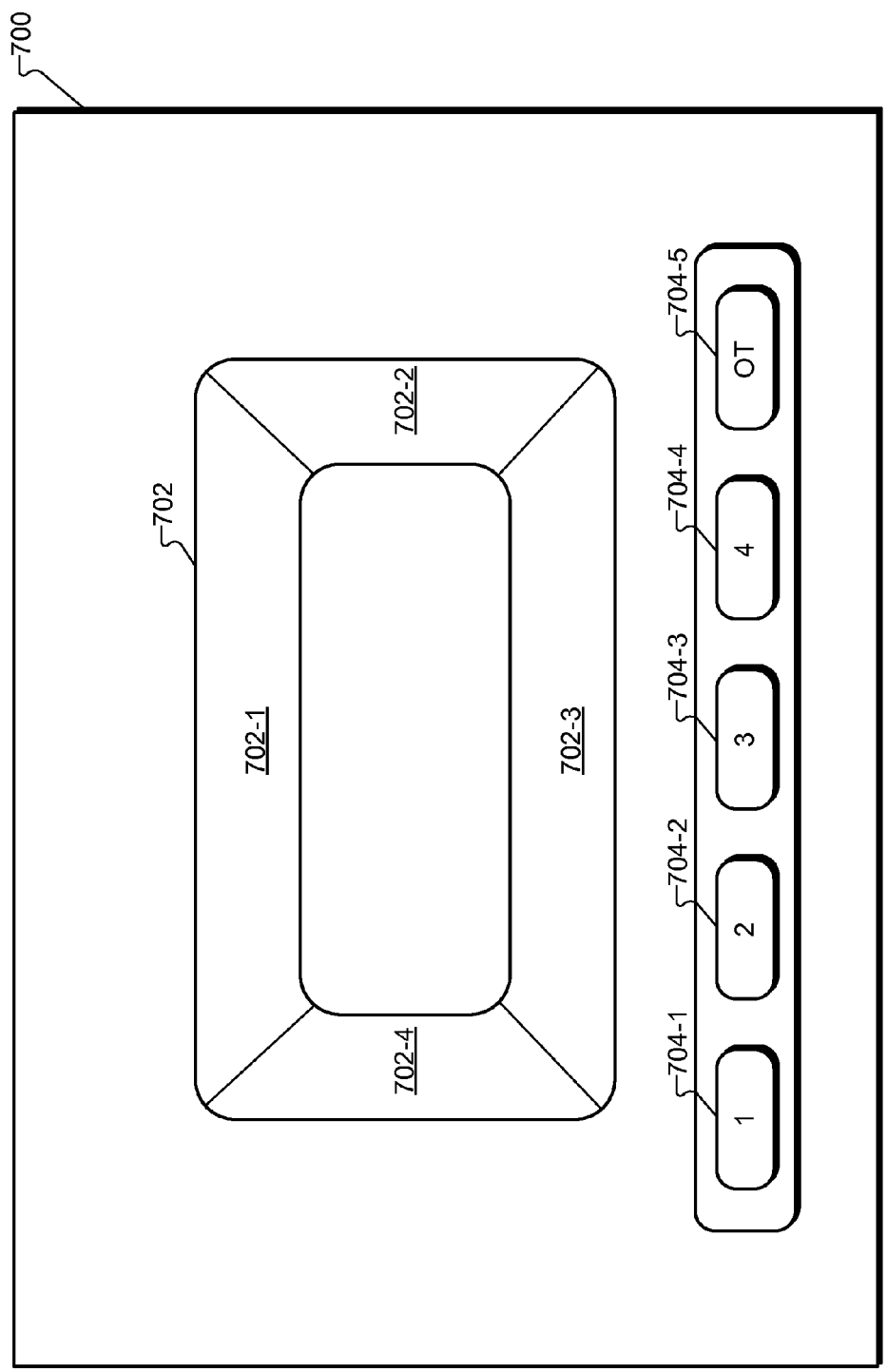

As mentioned, a user may direct system 100 to present media content generated by attendees located in a particular viewing area and/or during a particular time period associated with the live event. For example, FIG. 7 shows an exemplary GUI 700 that may be configured to facilitate user selection of a particular viewing area and/or time period.

As shown, GUI 700 may include a graphical object 702 that depicts or graphically represents venue 500. Graphical object 702 has been divided into selectable seating areas 702 (e.g., seating areas 702-1 through 702-4). In some examples, a user may direct system 100 to present media content generated by attendees located in a particular viewing area by selecting (e.g., touching) one of seating areas 702. System 100 may detect the selection and dynamically begin presenting media content instances generated in an actual seating area corresponding to the selected seating area 702. It will be recognized that a user may select multiple seating areas 702 and/or one or more custom viewing areas in any suitable manner.

GUI 700 is also configured to facilitate user selection of a particular time period associated with a live event. For example, as shown in FIG. 7, system 100 may present a plurality of graphical objects 704 (e.g., graphical objects 704-1 through 704-5) representative of a plurality of predefined time periods associated with the live event. System 100 may detect input provided by a user representative of a selection of one of graphical objects 704 and present media content instances generated during a predefined time period associated with the selected graphical object 704.

To illustrate, the live event may be a sporting event. In this case, as shown in FIG. 7, each of graphical objects 704 may be representative of an official time period associated with the sporting event. In the example of FIG. 7, these official time periods include four quarters and an overtime period. A user may select one of the graphical objects 704 (e.g., graphical object 704-1) to direct system 100 to present media content instances generated during a corresponding official time period (e.g., during a first quarter of the sporting event).

In cases where system 100 presents a graphical object that depicts a venue associated with a live event (e.g., graphical objects 602 and 702), system 100 may detect input provided by a user that specifies a particular viewing area within the venue by detecting a touch gesture performed by the user with respect to the graphical object. As used herein, a "touch gesture" refers to any movement of a finger or other object (e.g., a stylus) associated with the user while the finger or object is touching a display screen (e.g., a display screen displaying a GUI by which attendee-generated media content instances are presented). For example, a touch gesture may include a movement of a finger along a surface of a display screen in a particular direction.

Figure 8:
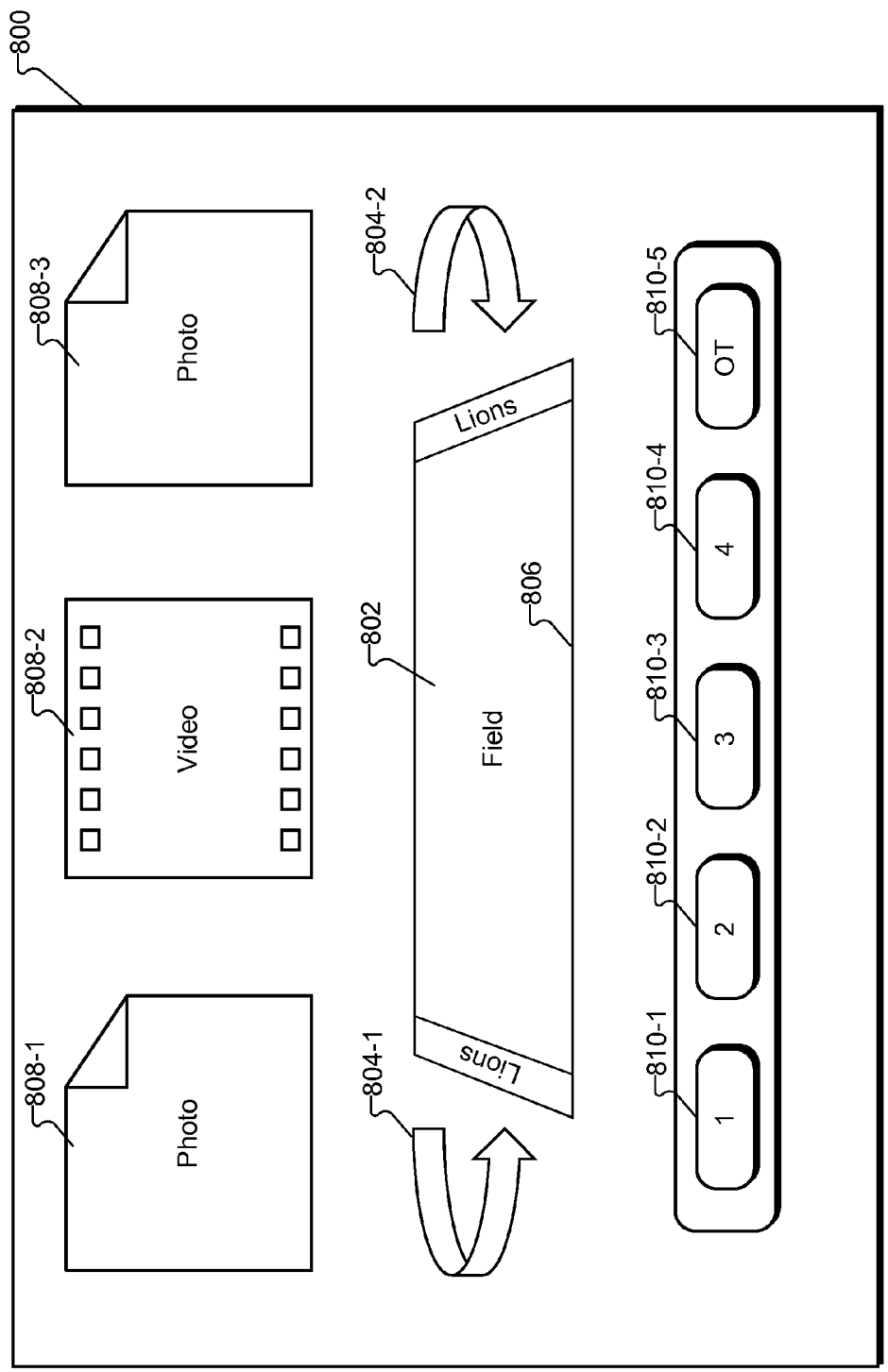

To illustrate, FIG. 8 shows another exemplary GUI 800 by which system 100 may present one or more media content instances generated by attendees of a live event. In the example of FIG. 8, the live event is a football game. As shown, a graphical object 802 representative of a football field may be presented within GUI 800. Graphical object 802 is rotatable, as shown by arrows 804-1 and 804-2. For example, the user may utilize one or more touch gestures to rotate graphical object 802 until a desired viewing perspective of the football field is achieved. For example, in FIG. 8, the user has rotated graphical object 802 to select a viewing area associated with a sideline 806 of the football field (e.g., a seating area along sideline 806). One or more media content instances (e.g., media content instances 808-1 through 808-3) that have geotagged locations included within the selected viewing area may be presented within GUI 800 in a manner that is temporally synchronized with an event timeline of the football game. To select a different viewing area (e.g., a seating area located behind one of the end zones), the user may utilize one or more touch gestures to rotate graphical object 802 to a position corresponding to the different viewing area.

GUI 800 may also facilitate user selection of a specific time period associated with the football game. For example, graphical objects 810 (e.g., graphical objects 810-1 through 810-5) may be presented within GUI 800. Graphical objects 810 may similar to graphical objects 704 in that they represent four quarters and an overtime period associated with the football game. Hence, a user may select one of the graphical objects 810 (e.g., graphical object 810-1) to direct system 100 to present media content instances generated during a corresponding time period (e.g., during a first quarter of the football game).

Figure 9:
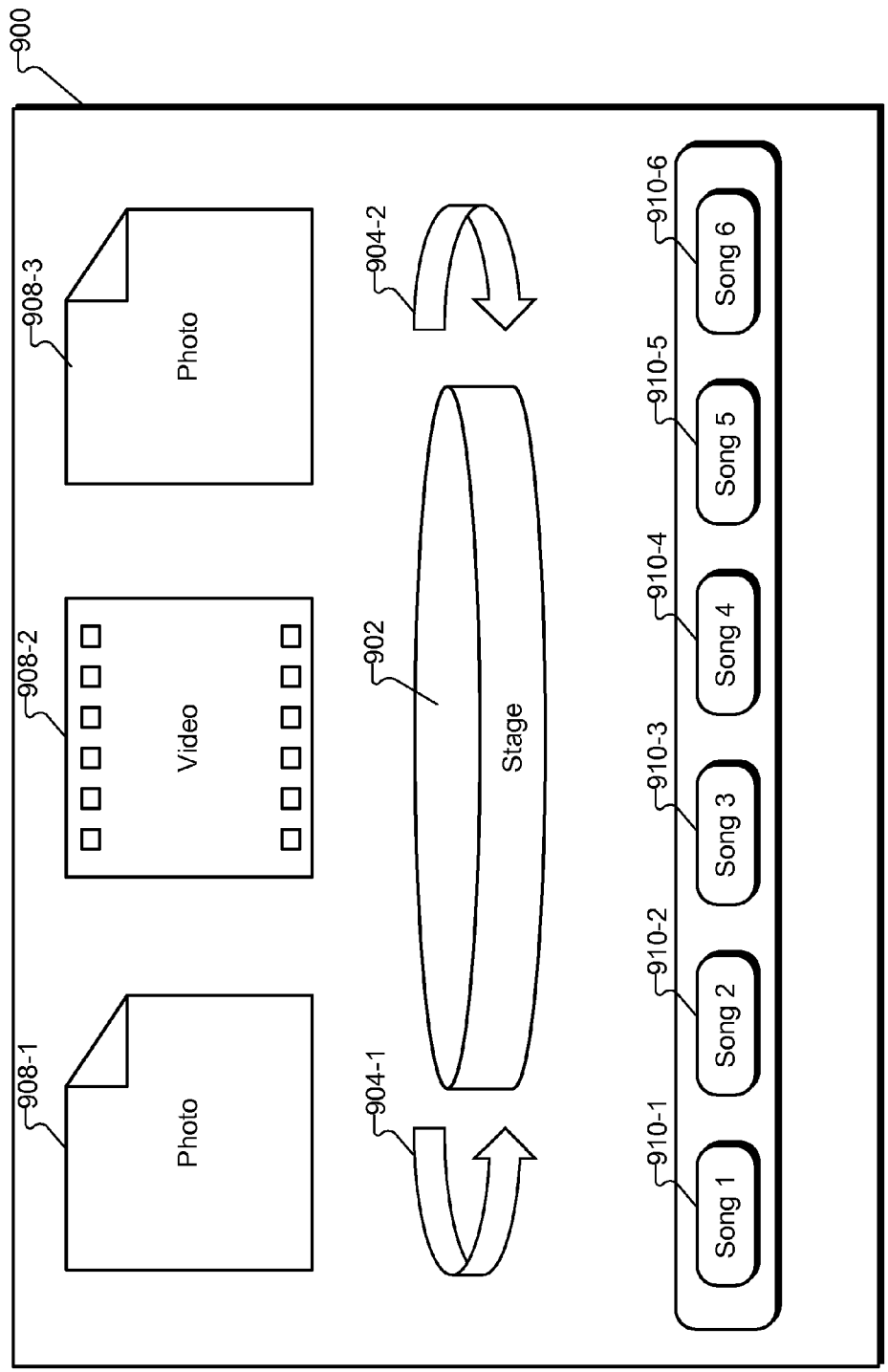

FIG. 9 shows another exemplary GUI 900 by which system 100 may present one or more media content instances generated by attendees of a live event. In the example of FIG. 9, the live event is a concert. As shown, a graphical object 902 representative of stage upon which the concert is performed may be presented within GUI 900. Graphical object 902 is rotatable, as shown by arrows 904-1 and 904-2. For example, the user may utilize one or more touch gestures to rotate graphical object 902 until a viewing area associated with the stage represented by graphical object 902 is selected, as described previously in connection with FIG. 8. One or more media content instances (e.g., media content instances 908-1 through 908-3) that have geotagged locations included within the selected viewing area may then be presented within GUI 900 in a manner that is temporally synchronized with an event timeline of the concert.

GUI 900 may also facilitate user selection of a specific time period associated with the concert. For example, graphical objects 910 (e.g., graphical objects 910-1 through 910-6) may be presented within GUI 900. Graphical objects 910 may represent various songs (e.g., song 1 through song 6) performed during the concert. Hence, a user may select one of the graphical objects 910 (e.g., graphical object 910-1) to direct system 100 to present media content instances generated during the performance of a song (e.g., song 1).

In some examples, a user may select an attendee-generated media content instance presented within any of the GUIs described herein. In response, system 100 may present one or more access options associated with the selected media content instance. For example, the user may be presented with one or more options to access additional information associated with the media content instance, record (e.g., download to permanent storage) the media content instance, mark the media content instance for future access, play the media content instance, communicate with (e.g., send a message to) the attendee who generated the media content instance, and/or take any other action with respect to the media content instance as may serve a particular implementation.

As mentioned, system 100 may be configured to present attendee-generated media content associated with a live event in conjunction with a presentation of the live event. For example, system 100 may detect a presentation of a live event by way of a media content access device (e.g., a set-top box device) associated with a user. In response, system 100 may present media content generated by one or more attendees of the live event in conjunction with the presentation of the live event and in a manner that is temporally synchronized with an event timeline associated with the live event.

To illustrate, a user may utilize a DVR device to record a broadcast of a football game. Subsequently, the user may direct the DVR device to present the recorded football game. System 100 may detect the presentation of the recorded football game and present media content instances generated by attendees of the football game in a manner that is temporally synchronized with an event timeline associated with the football game. In this manner, the user may view the football game and concurrently experience attendee-generated photos and/or videos (as well as other types of media content) of various plays that occur within the football game as those plays transpire during the presentation of the football game.

As another example, a user may not have access to a live broadcast of a live event and may instead view a simulated version of the live event on the Internet (e.g., an Internet-based "gamecast") as the live event transpires. System 100 may detect the presentation of the simulated version of the live event and present media content instances generated by attendees of the live in a manner that is temporally synchronized with an event timeline associated with the live event. In this manner, the user may view actual photos, videos, and other types of media content generated by people in attendance at the event, thereby enhancing the user's viewing experience of the simulated version of the live event.

In some examples, attendee-generated media content associated with a live event may be presented by way of a companion device (e.g., a mobile device) separate from a media content access device by which the live event is presented. Additionally or alternatively, the attendee-generated media content may be presented by way of the same media content access device by which the live event is presented.

Figure 10:
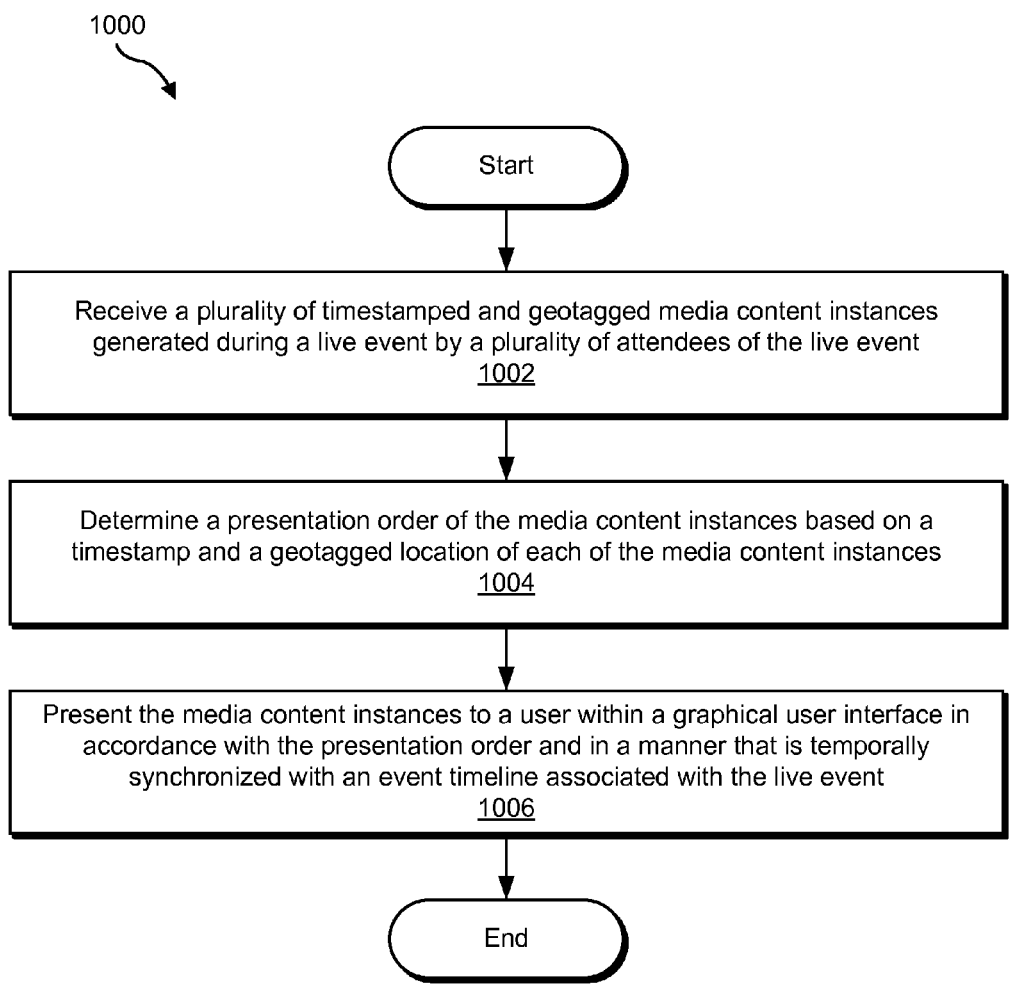
FIG. 10 illustrates another method of presenting media content generated by attendees of a live event according to principles described herein.

FIG. 10 illustrates another method 1000 of presenting media content generated by attendees of a live event. While FIG. 10 illustrates exemplary steps according to one embodiment, other embodiments may omit, add to, reorder, and/or modify any of the steps shown in FIG. 10. One or more of the steps shown in FIG. 10 may be performed by system 100 and/or any implementation thereof.

In step 1002, a media content presentation system receives a plurality of timestamped and geotagged media content instances generated during a live event by a plurality of attendees of the live event. Step 1002 may be performed in any of the ways described herein.

In step 1004, the media content presentation system determines a presentation order of the media content instances based on a timestamp and a geotagged location of each of the media content instances. For example, the presentation order may follow a viewing path representative of a plurality of different viewing angles of the live event within a venue associated with the live event. Step 1004 may be performed in any of the ways described herein.

In step 1006, the media content presentation system presents the media content instances to a user within a GUI in accordance with the presentation order and in a manner that is temporally synchronized with an event timeline associated with the live event. Step 1006 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
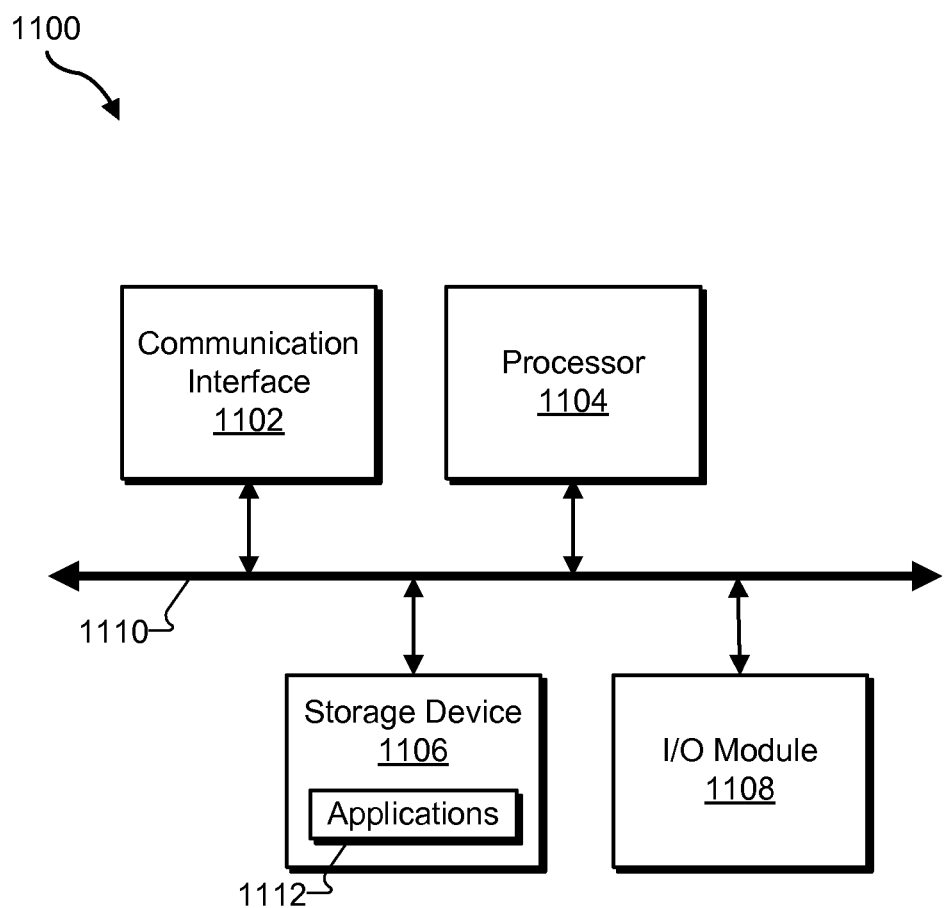
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with media content management facility 102 and/or detection facility 104. Likewise, storage facility 106 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a media content presentation system, a plurality of timestamped and geotagged media content instances generated during a live event by a plurality of attendees of the live event;
presenting, by the media content presentation system within a graphical user interface, a plurality of graphical objects representing a plurality of predefined time periods associated with the live event;
detecting, by the media content presentation system, a selection by a user of a graphical object included in the plurality of graphical objects and representative of a predefined time period included in the plurality of predefined time periods;
detecting, by the media content presentation system, input provided by the user specifying a viewing area within a venue associated with the live event;
identifying, by the media content presentation system, media content instances that have a timestamp included within the predefined time period and a geotagged location within the specified viewing area, the identified media content instances included in the plurality of media content instances;
presenting, by the media content presentation system within the graphical user interface, an additional graphical object that graphically represents the venue; and
presenting, by the media content presentation system within the graphical user interface and together with the additional graphical object that graphically represents the venue, the identified media content instances generated during the live event by the plurality of attendees of the live event to the user along a graphical representation of a viewing path representative of a plurality of different viewing angles of the live event within the specified viewing area in accordance with a presentation order that is based on the timestamp and the geotagged location of each of the identified media content instances.

2. The method of claim 1, wherein the receiving of the plurality of timestamped and geotagged media content instances comprises receiving uploads of the plurality of timestamped and geotagged media content instances from a plurality of mobile devices associated with the plurality of attendees.

3. The method of claim 1, wherein the detecting of the input specifying the viewing area within the venue comprises detecting input provided by the user specifying a particular seating area within the venue.

4. The method of claim 1,
wherein the detecting of the input specifying the viewing area within the venue comprises detecting a touch gesture performed by the user with respect to the additional graphical object.

5. The method of claim 4, wherein the touch gesture comprises a rotation by the user of the additional graphical object within the graphical user interface.

6. The method of claim 4, wherein the touch gesture comprises a selection by the user of a particular portion of the additional graphical object.

7. The method of claim 1, wherein the identified media content instances comprise a particular media content instance, and wherein the presenting of the identified media content instances to the user within the graphical user interface comprises presenting the identified media content instances in a manner that is temporally synchronized with an event timeline associated with the live event and further comprises presenting the particular media content instance for a predetermined amount of time associated with a temporal position along the event timeline that corresponds to a timestamp of the particular media content instance.

8. The method of claim 1, further comprising:
graphically indicating, by the media content presentation system within the graphical user interface, a geotagged location of each of the identified media content instances with respect to the additional graphical object that depicts the venue.

9. The method of claim 1, further comprising:
detecting, by the media content presentation system, a presentation of the live event by way of a media content access device associated with the user;
wherein the presenting of the identified media content instances is performed in response to the detecting.

10. The method of claim 9, wherein the presenting of the identified media content instances comprises presenting the identified media content instances by way of a companion device separate from the media content access device during the presentation of the live event.

11. The method of claim 1, further comprising:
detecting, by the media content presentation system, a selection by the user of a particular media content instance included in the identified media content instances; and
presenting, by the media content presentation system, one or more access options associated with the selected media content instance.

12. The method of claim 1, further comprising:
detecting, by the media content presentation system, a selection by the user of another graphical object included in the plurality of graphical objects and representative of an additional predefined time period included in the plurality of predefined time periods;
identifying, by the media content presentation system, one or more additional media content instances that have a timestamp included within the additional predefined time period and a geotagged location included within the specified viewing area, the identified one or more additional media content instances included in the plurality of media content instances; and
presenting, by the media content presentation system, the identified one or more additional media content instances to the user within the graphical user interface in a manner that is temporally synchronized with an event timeline associated with the live event.

13. The method of claim 1, further comprising:
detecting, by the media content presentation system, additional input provided by the user specifying another viewing area within the venue associated with the live event;
identifying, by the media content presentation system, one or more additional media content instances that have a timestamp included within the predefined time period and a geotagged location included within the specified another viewing area, the identified one or more additional media content instances included in the plurality of media content instances; and
presenting, by the media content presentation system, the identified one or more additional media content instances to the user within the graphical user interface in a manner that is temporally synchronized with an event timeline associated with the live event.

14. The method of claim 1, wherein the method further comprises:
facilitating, by the media content presentation system, creation by the user of one or more filter rules;
wherein at least one of the identifying and the presenting is performed in accordance with the one or more filter rules.

15. The method of claim 1, embodied as computer-executable instructions on at least one non-transitory computer-readable medium.

16. The method of claim 1, wherein the presenting of the identified media content instances to the user within the graphical user interface comprises presenting the identified media content instances in a manner that is temporally synchronized with an event timeline associated with the live event.

17. The method of claim 1, wherein the live event comprises a sporting event, and the predefined time period corresponds to an official time period associated with the sporting event.

18. The method of claim 1, wherein the live event comprises a concert, and the predefined time period corresponds to a particular song performed during the concert.

19. A method comprising:
presenting, by a media content presentation system within a graphical user interface, a plurality of graphical objects representing a plurality of predefined time periods associated with a live event;
detecting, by the media content presentation system, a selection by a user of a graphical object included in the plurality of graphical objects and representative of a predefined time period included in the plurality of predefined time periods;
receiving, by the media content presentation system, a plurality of timestamped and geotagged media content instances that are generated during the live event by a plurality of attendees of the live event and that have a timestamp included within the predefined time period;
determining, by the media content presentation system, a presentation order of the media content instances based on the timestamp and a geotagged location of each of the media content instances; and
presenting, by the media content presentation system within the graphical user interface in accordance with the presentation order, the media content instances generated during the live event by the plurality of attendees of the live event to a user along a graphical representation of a viewing path representative of a plurality of different viewing angles of the live event within a venue associated with the live event and in a manner that is temporally synchronized with an event timeline associated with the live event.

20. The method of claim 19, embodied as computer-executable instructions on at least one non-transitory computer-readable medium.

21. A system comprising:
at least one computing device including a processor and comprising:
a user-generated media content management facility configured to direct the processor to
receive a plurality of timestamped and geotagged media content instances generated during a live event by a plurality of attendees of the live event, and
present, within a graphical user interface, a plurality of graphical objects representing a plurality of predefined time periods associated with the live event;
a detection facility communicatively coupled to the user-generated media content management facility and configured to direct the processor to
detect a selection by a user of a graphical object included in the plurality of graphical objects and representative of a predefined time period included in the plurality of predefined time periods, and
detect input provided by the user specifying a viewing area within a venue associated with the live event;
wherein the user-generated media content management facility is further configured to direct the processor to
identify media content instances that have a timestamp included within the predefined time period and a geotagged location included within the specified viewing area, the identified media content instances included in the plurality of media content instances,
present an additional graphical object within the graphical user interface that graphically represents the venue, and
present, within the graphical user interface and together with the additional graphical object that graphically represents the venue, the identified media content instances generated during the live event by the plurality of attendees of the live event to the user along a graphical representation of a viewing path representative of a plurality of different viewing angles of the live event within the specified viewing area in accordance with a presentation order that is based on the timestamp and the geotagged location of each of the identified media content instances.

* * * * *